United States Patent [19]

Chu et al.

[11] Patent Number: 6,159,612
[45] Date of Patent: *Dec. 12, 2000

[54] MULTI-LAYER FILMS WITH SYNDIOTACTIC BARRIER LAYER CONTAINING A WAX

[75] Inventors: Shaw-Chang Chu, Princeton, N.J.; Michael Thomas Heffelfinger, Westerville, Ohio; Jay K. Keung, Macedon; Robert G. Peet, Pittsford, both of N.Y.

[73] Assignee: Mobil Oil Corporation, Fairfax, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,172

[22] Filed: Aug. 25, 1997

[51] Int. Cl.[7] ..................................................... B32B 27/37
[52] U.S. Cl. ......................... 428/484; 428/516; 428/910; 428/483; 428/476.1
[58] Field of Search ..................................... 428/515, 516, 428/910, 35.4, 484, 483, 476.1

[56] References Cited

U.S. PATENT DOCUMENTS

| | | | |
|---|---|---|---|
| 4,604,324 | 8/1986 | Nahmias et al. | 428/349 |
| 4,794,096 | 12/1988 | Ewen | 502/117 |
| 4,892,851 | 1/1990 | Ewen et al. | 502/104 |
| 4,975,403 | 12/1990 | Ewen | 502/113 |
| 5,141,801 | 8/1992 | Takeshita et al. | 428/348 |
| 5,155,080 | 10/1992 | Elder et al. | 502/152 |
| 5,155,160 | 10/1992 | Yeh et al. | 524/487 |
| 5,162,278 | 11/1992 | Razavi | 502/152 |
| 5,254,394 | 10/1993 | Bothe et al. | 428/212 |
| 5,462,807 | 10/1995 | Halle et al. | 428/500 |
| 5,468,440 | 11/1995 | McAlpin et al. | 264/291 |
| 5,491,019 | 2/1996 | Kuo | 428/213 |
| 5,529,843 | 6/1996 | Dries et al. | 428/336 |
| 5,620,803 | 4/1997 | Oyama et al. | 428/516 |
| B1 5,468,440 | 4/1997 | McAlpin et al. | 264/291 |

FOREIGN PATENT DOCUMENTS

| | | |
|---|---|---|
| 341188 | 8/1989 | European Pat. Off. . |
| 0 499 216 A1 | 8/1992 | European Pat. Off. . |
| WO9502630 | 1/1995 | WIPO . |

OTHER PUBLICATIONS

*The Effect of Polypropylene/Wax Blends on Moisture Barrier Properties;* 1993 Polymers, Laminations & Coatings Conference, pp. 267–274.

Primary Examiner—Paul Thibodeau
Assistant Examiner—D. Lawrence Tarazano
Attorney, Agent, or Firm—Dennis P. Santini; T. Dean Simmons

[57] ABSTRACT

An oriented multi-layer film comprises:
(a) at least one layer comprising an olefin polymer, for example, isotactic polypropylene; and
(b) a barrier layer adjacent the at least one layer of (a), comprising a syndiotactic polypropylene which preferably possesses an isotacticity of less than 25%, more preferably less than 15%, in particular less than 6%, and moisture and oxygen permeability reducing amounts of wax.

9 Claims, No Drawings

MULTI-LAYER FILMS WITH SYNDIOTACTIC BARRIER LAYER CONTAINING A WAX

BACKGROUND OF THE INVENTION

The invention relates to a barrier film which comprises oriented polypropylene. A barrier layer improves moisture barrier properties and reduces oxygen transmission.

Oriented polypropylene films are known for use in packaging operations. U.S. Pat. No. 4,604,324 to Nahmias, et al. discloses multi-layer polypropylene film structure comprising coextruded layers of a base layer of high stereoregularity polypropylene and a skin layer of comparatively low stereoregularity which contains anti-stick additives. In addition, the skin layer can contain up to 10 wt % of a wax to improve heat seal characteristics or optical properties of the film. U.S. Pat. No. 5,254,394 to Bothe, et al., incorporated herein by reference, discloses a polyolefin film for packaging comprising isotactic polypropylene base layer and a top layer of syndiotactic polypropylene which has high sealed-seam strength and excellent optical properties. The layers may contain lubricant additives such as waxes at levels of up to 2 wt %, relative to each layer.

U.S. Pat. No. 5,155,160 to Yeh, et al., incorporated herein by reference, discloses improving barrier properties of crystalline or isotactic polyolefin films by incorporating 3 to 10 wt % wax, such as paraffin wax in the isotactic polyolefin. The reference discloses affecting barrier properties by modifying chill roll conditions.

SUMMARY OF THE INVENTION

The invention relates to a multi-layer film which can provide an effective moisture and oxygen barrier without requiring such barrier agents as polyterpenes, alicyclic hydrocarbons, or high barrier polyvinylidene chloride coatings.

The invention relates to an oriented multi-layer film which comprises:

(a) at least one layer comprising an olefin polymer, and (b) a barrier layer adjacent layer (a) comprising a syndiotactic polypropylene homopolymer, which possesses isotacticity of less than 25%, and moisture and oxygen permeability reducing amounts of wax. More particularly, the (a) layer is different from the (b) layer.

The invention further relates to an oriented multilayer film comprising a syndiotactic propylene polymer and an amount of wax sufficient to achieve a water vapor transmission rate of less than about 0.2, specifically less than about 1.6 g/100 in$^2$/mil/day at about 38° C. and about 90% relative humidity.

Alternatively, the invention is directed to a process for preparing an oriented multi-layer film which comprises melt coextruding a combination comprising:

(a) at least one layer comprising an olefin polymer, and (b) a barrier layer adjacent layer (a) comprising a syndiotactic polypropylene homopolymer, which possesses isotacticity of less than 25%, and moisture and oxygen permeability reducing amounts of wax;

and orienting said coextruded combination.

DETAILED DESCRIPTION OF THE INVENTION

Layer (a)

At least one layer (a), of the multi-layer film comprises an olefin polymer such as a propylene polymer which is preferably predominantly (at least 90% by weight) comprised of propylene and preferably has a melting point of 140° C. or higher, more preferably a melting point of 150° C. or higher.

Isotactic polypropylene having an n-heptane soluble content of 15% by weight or less, copolymers of ethylene and propylene having an ethylene content of 10% by weight or less, and copolymers of polypropylene and ($C_4$–$C_8$) alpha-olefins having a ($C_4$–$C_8$) alpha-olefin content of 10% by weight or less are preferred examples of the olefin polymer used for the base layer.

The propylene polymer of the layer (a) preferably has a melt flow index of about 0.5 g/10 min to about 8 g/10 min, more preferably, 1.5 g/10 min to about 4 g/10 min, at 230° C. and at a load of 21.6 N (DIN 53735). Examples of such layer (a) propylene polymers include Fina 3371 (commercially available from Fina Oil and Chemical Company, and PP 4252 (commercially available from Exxon Corp.).

Barrier Layer

The barrier layer contains a syndiotactic polypropylene blended with a wax component. The syndiotactic polypropylene preferably possesses an isotacticity of less than 25%, more preferably less than 15%, in particular less than 6%. The mean length of sequence $n_r$ of the syndiotactic sequences is preferably greater than about 20, more preferably greater than about 25. The molar mass distribution corresponds to the relation $$M_w = k \times M_n,$$

where $M_w$ stands for the weight average of the molar mass distribution, $M_n$ stands for the number average of the molar mass distribution and k is a factor which is between about 1 and about 5, preferably between about 2 and about 3.

The weight average is preferably between about 60,000 and about 250,000, in particular between about 90,000 and about 160,000. The mean molar masses can be determined according to customary methods; of these, the method of gel permeation chromatography has proven to be particularly suitable.

Syndiotactic polypropylene resins suited to use in the present invention include EOD 93-06 and EOD 95-01, available from Fina Oil and Chemical Company.

The wax used is typically a hydrocarbon wax, which may be either a mineral wax or a synthetic wax. Polyethylene type wax is especially preferred which has an average chain length between 22 and 65 carbon atoms, a molecular weight between 300 and 800, and a melting point between about 125° and 190° F. (52° and 88° C.). These waxes include paraffin waxes, microcrystalline waxes, and intermediate waxes. Most preferred are paraffin waxes, which typically have an average chain length between 22 and 40 carbon atoms, a molecular weight between about 300 and 450, and a melting point between about 125° and 160° F. (52° and 71° C.). The paraffin wax typically consists of a mixture of normal and branched paraffins, with the normal paraffin content preferably being from 35 to 90 percent by weight. The paraffin wax typically has a broad molecular weight distribution. For example, each fraction of chains containing a certain number of carbon atoms preferably represents less than 25 percent, more preferably less than 20 percent, of the wax. A paraffin wax having a broad molecular weight distribution provides better barrier properties than a paraffin wax having a narrow molecular weight distribution, which is believed to be due to the formation by the wax having the broad molecular weight distribution of crystallites that have a morphology that conforms better with the morphology of the amorphous regions of the polyolefin. A particularly suitable wax is Chevron 143. It has a melting point of 143° F. (62° C.), an average chain length of 29 carbon atoms, an average molecular weight of 416, a normal paraffin content of 74 percent, and contains 12 percent $C_{28}$ fraction, 12 percent $C_{29}$ fraction, and 11 percent $C_{30}$ fraction (the three largest fractions in the wax).

Wax is added to the syndiotactic polypropylene in amounts which reduce water vapor transmission rate (WVTR) and oxygen transmission ($TO_2$) of the resulting film product. For present purposes, WVTR can be measured at 100° F. (38° C.) and 90 percent relative humidity in accordance with ASTM E96 and TAPPI Standard T464. $TO_2$ is measured in accordance with ASTM D 3985-81 (cc/100 in$^2$/24 h). Generally, the amount of wax added to the barrier layer can depend on the amorphousness of the polyolefin, which in turn can depend on the type of polyolefin, the method of cooling the extruded film containing the polyolefin, and the thickness of the film. Typically, the barrier layer contains greater than 10 wt % wax, specifically at least 12 wt % wax, say, at least 15 wt % wax.

Usually, the wax-containing barrier layer is not an exposed surface in order to avoid wax blooming to the surface. Accordingly, the barrier layer is often sandwiched between a core layer and an outer skin layer. In another embodiment, the barrier layer forms the core of a multilayer film.

Outer Layer

An outer layer of the present invention may be any of the coextrudable, biaxially orientable film-forming resins known. Such materials include those discussed above which are suitable for use in the (a) layer, including isotactic polypropylene, polypropylene blended with polybutene-1, and ethylene-propylene copolymer, including fractional ethylene-propylene copolymer. Suitable ethylene-propylene copolymers include ethylene-propylene random copolymer and ethylene-propylene block copolymer. In addition, polyethylene, polybutene-1, ethylene-propylene-butene-1 terpolymer, polyester, nylon, ethylene-vinyl-acetate, and ethylene vinyl-alcohol may be employed as the outer layer. In one embodiment, the skin layer can be identical in composition to the (a) layer.

Ethylene-propylene-butene-1 random terpolymers appropriate for use in the outer layer of the present invention include those containing 1–5 weight percent random ethylene, and 5–25 weight percent random butene-1. The amounts of the random ethylene and butene-1 components in these copolymers are typically in the range of 10 to 25 percent (ethylene plus butene-1) based on the total amount of the copolymer.

These copolymers typically have a melt flow rate in the range of about 5 to 10 with a density of about 0.9 and a melting point in the range of about 115° to about 130° C.

In one aspect of the invention the outer layer is derived from a low density polyethylene. This may be a linear low density polyethylene (LLDPE) or a standard low density polyethylene. These polymers typically have a melt index of 0.5 to 10. The low density polyethylenes should have a density of 0.88 to 0.93 while the linear materials may have a density as high as 0.94, usually in the range 0.90–0.94, e.g. 0.918 or 0.921, with a melt index from about 1 to about 10. The linear low density polyethylenes may be derived from ethylene together with other higher comonomers such as butene-1, hexene-1 or octene-1.

Each outer layer can range in thickness from 0.5 to 3 microns, preferably 0.5 to 1.0 micron, e.g., 0.5 to 0.75 micron.

Additives

In order to further improve certain properties of the multi-layer films of the invention, it is possible for one or more of the layers to contain appropriate additives in an effective amount. Preferred additives include antistatic agents, antiblocking agents, lubricants, stabilizers, and/or low molecular weight resins. Such additives are further described in U.S. Pat. No. 5,254,394, incorporated herein by reference.

Surface Treating

One or more of the exposed layers of the multi-layer films of the present invention can be surface-treated to render them receptive, e.g., to printing inks. The surface treatment can be carried out according to one of the methods known in the art. Methods which are known include, e.g., electrical spray discharge between two electrodes, i.e., corona treatment, flame treatment, or treatment by means of a polarized flame.

Coating

The syndiotactic polypropylene/wax barrier layer of the present invention provides multi-layer films of high moisture barrier and high oxygen transmission barrier without requiring the use of barrier coatings whose presence can often cause difficulties in product recycling. However, where necessary, moisture barrier capability may be further enhanced by techniques such as coating with acrylic polymers, polyvinylidene chloride (PVDC) or poly(vinyl) alcohol.

Acrylic coatings can be derived from any of the terpolymeric compositions disclosed in U.S. Pat. Nos. 3,753,769, and 4,865,908, the contents of which are incorporated by reference herein. These coating compositions contain as a film forming component a resin consisting essentially of an interpolymer of (a) from about 2 to about 15, and preferably from about 2.5 to about 6, parts by weight of an alpha-beta monoethylenically unsaturated carboxylic acid selected from the group consisting of acrylic acid, methacrylic acid, and mixtures thereof, and (b) from about 85 to about 98, and preferably from about 94 to about 97.5, parts by weight of neutral monomer esters, said neutral monomer esters preferably comprising (1) methyl acrylate or ethyl acrylate and (2) methyl methacrylate. These interpolymer compositions are further characterized by preferably comprising from about 30 percent to about 55 percent by weight of methyl methacrylate when said alkyl acrylate is methyl acrylate, and from about 52.5 percent to about 69 percent by weight of methylmethacrylate when said alkyl acrylate is ethyl acrylate. As more fully described infra, such coating compositions can be applied to the films herein in a variety of ways including in the form of ammoniacal solutions.

Similarly useful are copolymeric coating compositions prepared from the foregoing neutral monomer esters. These coating compositions are advantageously applied to the film laminates in the form of emulsions.

The coating can also be based on any of the known and conventional polyvinylidene chloride (PVDC) compositions heretofore employed as coatings in film manufacturing operations, e.g., any of the PVDC materials described in U.S. Pat. Nos. 4,214,039; 4,447,494; 4,961,992; 5,019,447; and 5,057,177.

U.S. Pat. No. 5,230,963 discloses enhancing oxygen barrier of films by a method involving a coating both of which are incorporated herein by reference, preferably with prior application of a primer layer to enhance adhesion of the PVDC coating layer to the film surface to which it is applied. Commercially available PVDC latexes having a vinylidene chloride content of at least 50% and preferably from about 75% to about 92% may be employed. The PVDC can also be provided as a copolymer of vinylidenechloride and one or more other ethylenically unsaturated comonomers including alpha, beta ethylenically unsaturated acids such as acrylic and methacrylic acids; alkyl esters containing 1–18 carbon atoms of said acids, such as methylmethacrylate, ethyl acrylate, butyl acrylate, etc. In addition alpha, beta ethylenically unsaturated nitrites such as acrylonitrile and methacrylonitrile and monovinyl aromatic compounds such as styrene and vinyl chloride comonomers can be employed. Specific PVDC latexes contemplated comprise: 82% by weight vinylidene chloride, 14% by weight ethyl acrylate and 4% by weight acrylic acid. Alternatively a polymer latex comprising about 80% by weight vinylidene chloride, about 17% methyl acrylate and about 3% by weight methacrylic acid can likewise be employed.

The vinyl alcohol polymers which may be used as coatings can be any commercially available material. For example, Vinol 125, 99.3 + % super hydrolyzed polyvinyl alcohol, or VINOL 325, 98% hydrolyzed polyvinyl alcohol obtained from Air Products, Inc. Application of a PVOH coating is further described in U.S. Pat. No. 5,230,963, incorporated herein by reference.

Before applying the coating composition to the appropriate substrate, the upper surface of the film is preferably treated as noted above to increase its surface energy and therefor insure that the coating layer will be strongly adherent thereto thereby reducing the possibility of the coating peeling or being stripped from the film. This treatment can be accomplished employing known techniques, such as, for example, film chlorination, i.e., exposure of the film surface to gaseous chlorine, treatment with oxidizing agents such as chromic acid, hot air or steam treatment, flame treatment and the like. Although any of these techniques is effectively employed to pretreat the film surface, a particularly desirable method of treatment is the so-called electronic treatment method which comprises exposing the film surface to a high voltage corona discharge while passing the film between a pair of spaced electrodes. After electronic treatment of the film surface, the coating composition is then applied thereto.

In applications where even greater coating-to-film adherence is desired, i.e., greater than that resulting from treatment of the film surface by any of the aforediscussed methods, an intermediate primer coating can be employed to increase the adherence of the coating composition to the film. In this case, the film is advantageously first treated by one of the foregoing methods to provide increased active adhesive sites thereon (thereby promoting primer adhesion) and to the thus treated film surface there is subsequently applied a continuous coating of a primer material. Such primer materials are well known in the prior art and include, for example, epoxy and poly(ethylene imine) (PEI) materials. U.S. Pat. Nos. 3,753,769 to Steiner, 4,058,645 to Steiner and 4,439,493 to Hein et al., incorporated herein by reference, disclose the use and application of such primers. The primer provides an overall adhesively active surface for thorough and secure bonding with the subsequently applied coating composition and can be applied to the film by conventional solution coating means, for example, by mating roller application.

The coating composition can be applied to the film as a solution, e.g., one prepared with an organic solvent such as an alcohol, ketone, ester, etc. However, since the coating composition can contain insoluble, finely divided inorganic materials which are difficult to keep well dispersed in organic solvents, it is preferable that the coating composition be applied to the treated surface in any convenient manner, such as by gravure coating, roll coating, dipping, spraying, etc. The excess aqueous solution can be removed by squeeze rolls, doctor knives, etc.

The film can be stretched in the machine direction, coated with the coating composition and then stretched perpendicularly in the transverse direction. In yet another embodiment, the coating can be carried out after biaxial orientation is completed. Biaxially oriented film is typically stretched about 4.5 to about 6 times in the machine direction (MD), and about 6 to about 13 times in the transverse direction (TD). The overall orientation (MD×TD) can range from about 25 to about 80.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). In general, the thickness of the applied coating is such that it is sufficient to impart the desired seal peelability, oxygen and water vapor barrier characteristics to the resulting film. Generally, the coating comprises 1 to 25 wt %, preferably 7 to 15 wt % of the entire coated film composition. The coating on the film is subsequently dried by hot air, radiant heat or by any other convenient means.

In each of the examples, the barrier properties of the films were tested by the following methods.

EXAMPLES 1 to 3

Five-layer multi-layer films of the present invention were prepared employing commercially available systems for coextruding resins. Each multi-layer film had the structure ABCBA where A is the skin layer, B is the barrier layer, and C is the base layer. The base layer used in all three examples was Fina 3371, a conventional isotactic homopolymer of propylene. The barrier layers were syndiotactic polypropylene (EOD 9306) 15 wt % wax being added to the syndiotactic polypropylenes in Examples 2 and 3. The skin layers were an ethylene-propylene terpolymers (XPM 7702), available from Chisso for Example 1, Z9470 and 8573HB, available from Fina, for Examples 2 and 3, respectively.

The multi-layer films of the Examples were prepared as follows:

The polymers were brought to the molten state and coextruded from a conventional extruder through a flat sheet die, the melt streams being combined in an adapter prior to being extruded from the die. After leaving the die, the multi-layer film structure is chilled and the quenched sheet then reheated and oriented.

The film was biaxially oriented. After orientation, the edges of the film were trimmed and the film wound into a roll.

In general, the total film thickness of the multi-layer film structure having a structure which can be illustrated by layers ABCBA where layer A is an outer layer, layer B is an intermediate layer and layer C is a core layer. The barrier layer of this invention is, typically, employed in layer B or C. The film is usually from about 10 $\mu$m, to 64 $\mu$m, preferably from about 12 $\mu$m to 50 $\mu$m. The thickness relationship of the layers is sometimes important. In particular, the B layers are provided as a relatively thick layer of about 5 to about 40 percent of the total thickness of the film with from about 10% to 25% being preferred. The A layer is advantageously from about 1 $\mu$m to 5 $\mu$m in thickness when the total film is, for example, about 0.8 mil thick.

The core layer, C is advantageously from about 40% to about 95% of the total thickness of the film, preferably from about 50–85%.

The data in the Table below show the benefits of the film made according to the invention. Examples 2 and 3 are compositions in accordance with the invention and show improvement over Example 1 (Comparative) in water vapor transmission (WVTR).

The film of Example 2 had a "C" layer thickness of about 29 microns, each "B" layer had a thickness of about 4.3 microns, and each "A" layer had a thickness of about 1.3 microns to provide a film of about 40.2 microns.

The film of Example 3 had a "C" layer thickness of about 28.7 microns, each "B" layer had a thickness of about 2.9 microns and each "A" layer had a thickness of about 0.99 microns to provide a film of about 36.5 microns.

TABLE

| Wax (Wt. %) | Example No. | WVTR[1] Total | WVTR[1] Ambient | OTR[2] |
|---|---|---|---|---|
| 0 | 1 | | 0.365 | |
| 15 | 2 | 1.58 | 0.13 | 21.2* |
| 15 | 3 | 1.44 | 0.112 | 22.5* |

Note:
[1]WVTR = gm/100 in$^2$/mil/day measured at 38° C. & 90% relative humidity
[2]OTR* = cc/100 in$^2$/day at 1 atm, 23° C. & 0% relative humidity
*The OTR of conventional polypropylene is typically about 150 cc/in 2/day at 1 atm 23° C. and 0% relative humidity.

What is claimed is:

1. An oriented multi-layer film which comprises:
   (a) at least one layer comprising an olefin polymer, and
   (b) a barrier layer adjacent the (a) layer comprising a syndiotactic propylene homopolymer, which possesses isotacticity of less than 25%, and moisture and oxygen permeability reducing amounts of wax in an amount of at least about 15% by weight of wax.

2. The multi-layer film of claim 1 which further comprises:
   (c) a skin layer adjacent the barrier layer comprising polyolefin.

3. The multi-layer film of claim 1 which further comprises:
   (c) an outer layer adjacent the barrier layer comprising polyolefin selected from the group consisting of isotactic polypropylene, ethylene-propylene random copolymer, ethylene-propylene block copolymer, ethylene-propylene-butene-1 copolymer, polybutene-1, polyester, nylon, ethylene vinyl acetate copolymer and ethylene vinyl alcohol copolymer.

4. The oriented multi-layer film of claim 3 wherein the outer layer (c) is coated with a coating selected from the group consisting of a polyvinylidene chloride coating, a polyvinyl alcohol coating, and an acrylic coating.

5. The oriented multi-layer film of claim 1 wherein the wax of barrier layer (b) is a hydrocarbon wax having an average chain length between 22 and 65 carbon atoms, a molecular weight between 300 and 800, and a melting point between 125° F. and 190° F.

6. An oriented multilayer film comprising at least one barrier layer comprising a syndiotactic propylene polymer and an amount of wax sufficient to achieve a water vapor transmission rate of less than about 0.2 g/100 in$^2$/mil/day at about 38° C. and about 90% relative humidity.

7. The oriented multilayer film of claim 5, wherein said hydrocarbon wax is a polyethylene wax.

8. The oriented multilayer film of claim 5, wherein said hydrocarbon wax is selected from the group consisting of paraffin wax and microcrystalline wax.

9. The oriented multilayer film of claim 1 having a water vapor transmission rate of less than about 0.2 g/100 in$^2$/mil/day at about 38° C. and about 90% relative humidity.

* * * * *